UNITED STATES PATENT OFFICE.

A. MONNIER, OF CAMDEN, NEW JERSEY.

IMPROVEMENT IN MANUFACTURE OF SULPHURIC ACID.

Specification forming part of Letters Patent No. 17,976, dated August 11, 1857; Reissue No. 502, dated October 6, 1857; Reissue No. 603, dated September 21, 1858.

*To all whom it may concern:*

Be it known that I, ALFRED MONNIER, of the city of Camden and State of New Jersey, have invented a new and useful improvement in the process of treating native metallic sulphurets or arsenio-sulphurets for the making of sulphuric acid and the obtaining of the metals contained in them as oxides or sulphates; and I do hereby declare the following to be a full and exact description of the same.

Heretofore sulphuric acid has been manufactured by burning sulphur with a free accession of atmospheric air, and thus forming sulphurous acid, ($SO_2$,) which is united with oxygen obtained by burning nitrate of potash or nitrate of soda. Sometimes sulphuric acid has been manufactured from metallic sulphuret or pyrites by heating it in close retorts and distilling over the sulphur, and afterward burning the sulphur so obtained with oxygen derived as in the other process; but in this way only thirty per cent. of the sulphur contained in the pyrites could be extracted. Another mode of treating pyrites was to burn the pyrites in a furnace furnished with a free supply of oxygen by the draft of a chimney or by a blower. In this way only forty per cent. of the sulphur could be obtained in the form of sulphurous acid from the metallic sulphurets. A third mode of treating the pyrites or sulpuret was by decomposing the sulphuret with a current of heated steam, and thus obtaining sulphureted hydrogen, (SH.) This was then collected in a gasometer and burned, forming sulphurous acid and water, which sulphurous acid, so obtained, was oxidized as above stated; and in the extraction of copper, nickel, cobalt, or zinc, &c., from their sulphuret or arsenio-sulphurets it has been customary to expel part or the whole of the sulphur and arsenic by roasting them in a pile mixed with wood or coal, or in a reverberatory furnace after having broken them into small fragments or crushed them into powder. Sometimes—as, for example, the sulphurets or arsenio-sulphurets of iron, copper, cobalt, nickel, &c.—the roasting has been preceded by a fusion with a suitable flux to remove the gangues from the ore. In either of these modes the operation is long and difficult, and requires a large amount of fuel to expel the arsenic and sulphur from the ores.

My invention consists of an improvement in the working of ores consisting of or containing native sulphurets or arsenio-sulphurets of any of the metals, (lead and mercury excepted,) whether as simple or compound sulphurets or arsenio-sulphurets, by converting the sulphur into sulphurous acid for the making of sulphuric acid and the metals into oxides or sulphates, and I treat the sulphurets as follows: If I wish to obtain sulphuric acid and the oxide of iron from an ore containing only sulphuret of iron, then the ore is to be mixed more or less, either in fragments or in powder, with from twenty to seventy-five per cent. of its weight of either caustic soda, carbonate of soda, sulphuret of sodium, sulphate of soda, or bisulphate of soda, (or sulphate of soda and sulphuric acid, so as to form bisulphate of soda,) or with corresponding compounds of potash, or marl, or sand containing potassa, or with sulphate of lime, sulphate of baryta, sulphate of strontia, or sulphate of iron, whether simple or mixed or in combination. The addition of a little common clay to this will assist in uniting the mass. To this compound a sufficient quantity of water is added to keep it moist, and the mixture is retained in a state of moisture for eight or ten days. It is then molded into blocks of any convenient size or shape. When it is desired to use these blocks, they are to be heated, so as to expel the water. This expulsion of the water leaves the mass in a porous state and facilitates its combustion. If it is desired to employ the mixture at once, a smaller quantity of water may be employed, sufficient to make the mass coherent, and this mixture is immediately made into blocks. These blocks are burned in the same manner in which pure sulphur is ordinarily burned; or it will burn better in a muffle, heat being supplied through a grate. This compound burns very freely, and all or nearly all of the sulphur of the pyrites is converted into sulphurous acid, and is afterward caused to combine with oxygen, supplied in the ordinary manner of making sulphuric acid—viz., from nitrate of potash or nitrate of soda or nitric acid; but if I do not wish to produce sulphuric acid, and the ore contains the sulphuret or arsenio-sulphuret of another metal, then these blocks are roasted in a reverberatory furnace, such as is ordinarily

BEST AVAILABLE COPY used for roasting sulphuret of copper, with this difference, that the mass need not be turned over, as is ordinarily required in such furnaces. From three to three and a half hours are sufficient for the expulsion of the sulphur and arsenic. These blocks can be burned also in a vertical furnace like a limekiln. The compound burns very freely, and all or nearly all the sulphur and arsenic will be expelled. When it is an arsenio-sulphuret, the addition to the above compound of a small jet of steam in the furnace will accelerate the decomposition. When caustic soda, sulphuret of sodium, carbonate of soda, sulphate of soda, bisulphate of soda, (or a mixture of sulphate of soda and sulphuric acid,) or either of the corresponding salts of potash is employed, the residue, after the sulphur has been converted into sulphurous acid, will contain sulphate of soda and some bisulphate of soda, or a salt of potassa and peroxide of iron, with some sulphate of iron. The sulphates can be dissolved in water, and after concentration or evaporation to dryness may be used again for the decomposition of a fresh quantity of sulphuret of iron or pyrites.

The sulphate of iron or the sulphates of other metals, which are formed in more or less quantity, are very advantageous, by reason of their reducing the quantity of nitrate of potash, nitrate of soda necessary to be used in the formation of sulphuric acid.

If the ore to be treated contains, along with the sulphuret of iron, the sulphurets of copper, nickel, cobalt, &c., then by applying a greater or less amount of heat to the ore there will remain after the calcination an oxide of iron, together with oxides or sulphurets or sulphates of copper, nickel, cobalt, &c.; in a state of partial union. The nature of this residue will vary with the amount of heat used. If a strong heat be applied, oxides of these metals will be produced in large quantities, and only a small proportion of the sulphates by lixiviation in water. The small quantity of sulphates is dissolved along with the sulphates of soda, and the residue, or oxides of iron, copper, nickel, or cobalt, can be treated by slightly-diluted acid. (Sulphuric acid is to be preferred, for the oxide of iron is nearly insoluble by this acid, when diluted.) This dissolves the oxides of copper, nickel, or cobalt; or, instead of treating the oxide so produced after the extraction of the sulphates by sulphuric acid, as above described, they can be treated by sulphuric acid before the extraction of the sulphate of soda or potassa, and then they will be obtained as sulphates. If less heat be applied, the iron will be nearly entirely oxidized, and the other metals will remain as sulphurets, together with a small quantity of sulphates of these metals. These sulphates are dissolved, along with the sulphate of soda, in water, and the residue will be oxide of iron and sulphurets of copper, nickel, and cobalt. This residue is then to be fused with suitable flux, so as to remove the oxide of iron, and thus is obtained a valuable sulphuret of copper, nickel, cobalt, &c.; but by a proper regulation of the heat, the iron will be nearly all oxidized, and the other metals converted mostly into sulphates, which, when dissolved in water, can be treated as may seem best for the extraction of those metals. For example, if it is only a sulphuret of iron and copper, the sulphate of copper so produced can be precipitated by metallic iron, and then the solution will contain sulphates of iron and soda, which can be concentrated or evaporated to dryness and used again. If, at the same time, some oxide or sub-sulphate of copper, &c., be produced, the bisulphate of soda formed in the burning and present in the residue will, when the whole is treated by warm water, convert them into the sulphates of their respective metals; or, previous to the precipitation or separation of the copper or other metallic sulphate, the solution can be concentrated by evaporation, and allowed to crystallize, so as obtain the greater part of the soda as Glauber's salt, which can be dried and used again. The solution which contains the metallic sulphates and the balance of the sulphate of soda can be treated as it may seem best for the extraction of the metals, &c. If the sulphate of iron is mixed in the first instance with the pyrites, the residue will be peroxide of iron only; or if sulphate of lime, of strontia, or of baryta be employed, the residue will be sulphate of lime, of strontia, or of baryta, mixed with peroxide of iron. If sulphurets of zinc or analogous sulphurets be treated, the process is the same as above mentioned, except that when it is desired to obtain the oxide or sulphate more pure, the sulphate of the metal under treatment might be substituted for the sulphate of iron.

Instead of using caustic soda, sulphuret of sodium, carbonate of soda, sulphate of soda, bisulphate of soda, (or sulphate of soda and sulphuric acid,) sulphate of iron, or either of the salts of potassa above named in the solid state in the first stage of the process, these can be used in the state of a concentrated solution. Either of the salts above mentioned could be used in the preliminary treatment of the sulphurets or arsenio-sulphurets; or the sulphate of soda (alone or with the addition of sulphuric acid to form a bisulphate of soda) would answer. If marl or sand containing potassa be used, either alone, (and better with the addition of sulphuric acid,) for the burning of the metallic sulphuret, it will yield sulphate of potassa; or if some aluminous clay be had, it will produce alum, and hence this process can be used with great economy for obtaining sulphate of potassa or alum.

The advantage of my improved process above described is that all or nearly all of the sulphur contained in the sulphuret of iron or other metallic sulphurets can be converted into sulphuric acid, thus effecting a great economy in the manufacture of that acid, giving the oxide of iron, which can be reduced or

United States Patent Office

PTO - BOYERS, PA Duty Station

MISSING PAGE TEMPORARY NOTICE

PATENT # RE603 FOR ISSUE DATE 9-21-1858

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE

P. 3 of left + rest.

N/A. Boyers at 11-3-92.

Data Conversion Operation

Boyers, Pa